(12) United States Patent
Floersch et al.

(10) Patent No.: US 7,434,774 B1
(45) Date of Patent: Oct. 14, 2008

(54) MONITOR MOUNTING APPARATUS (75) Inventors: Peter J. Floersch, Eagan, MN (US);
Mark W. Wacker, Eagan, MN (US);
Gregory J. Miller, Apple Valley, MN (US)

(73) Assignee: Engineered Network Systems, Inc., Burnsville, MA (US)

( * ) Notice: Subject to any disclaimer, the term of this patent is extended or adjusted under 35 U.S.C. 154(b) by 320 days.

(21) Appl. No.: 10/977,980

(22) Filed: Oct. 29, 2004

Related U.S. Application Data (60) Provisional application No. 60/571,645, filed on May 14, 2004.

(51) Int. Cl.
*F16M 11/14* (2006.01)

(52) U.S. Cl. .................. 248/183.2; 248/183.1; 248/923; 361/681

(58) Field of Classification Search ............ 248/231.71, 248/183.2, 183.1, 125.7, 178.1, 919, 921–923, 248/918; 403/112–113, 116, 157
See application file for complete search history.

(56) References Cited

U.S. PATENT DOCUMENTS

| | | | |
|---|---|---|---|
| 5,335,142 A * | 8/1994 | Anderson | 361/681 |
| 5,697,588 A * | 12/1997 | Gonzalez et al. | 248/221.11 |
| 5,842,672 A | 12/1998 | Sweere et al. | |
| 5,947,429 A | 9/1999 | Sweere et al. | |
| 5,992,809 A | 11/1999 | Sweere et al. | |
| 6,012,693 A | 1/2000 | Voeller et al. | |
| 6,015,120 A | 1/2000 | Sweere et al. | |
| 6,019,332 A | 2/2000 | Sweere et al. | |
| 6,419,196 B1 | 7/2002 | Sweere et al. | |
| 6,510,049 B2 * | 1/2003 | Rosen | 361/681 |
| 6,601,810 B2 * | 8/2003 | Lee | 248/278.1 |
| 6,609,272 B1 * | 8/2003 | Lee | 16/307 |
| 6,876,545 B2 * | 4/2005 | Tseng et al. | 361/681 |
| 2003/0001057 A1 | 1/2003 | Sweere et al. | |

* cited by examiner

*Primary Examiner*—Gwendolyn Baxter
(74) *Attorney, Agent, or Firm*—Haugen Law Firm PLLP; Mark J. Burns

(57) ABSTRACT

A monitor mounting apparatus includes a base assembly having a first fixed portion and a second rotatable portion that is rotatably coupled to the first fixed portion about a first axis that is substantially perpendicular to the first fixed portion. The apparatus further includes a tensioning mechanism for operably and selectively adjusting frictional resistance to the rotatable coupling between the second rotatable portion and the first fixed portion. The apparatus also includes a monitor mounting plate that is operably coupled to the second rotatable portion of the base assembly, which monitor mounting plate is configured to operably receive display monitors thereto.

2 Claims, 6 Drawing Sheets

MONITOR MOUNTING APPARATUS

CROSS-REFERENCE TO RELATED APPLICATION

This application claims priority from U.S. provisional application Ser. No. 60/571,645, filed on May 14, 2004 and entitled MONITOR MOUNTING APPARATUS, the content of which is incorporated herein in its entirety.

FIELD OF THE INVENTION

The present invention relates to monitor mounting assemblies generally, and more particularly to monitor mounting assemblies that provide a compact mounting arrangement of a monitor to a mounting plate, in combination with the capability to selectively adjust the ease of rotation of the mounting plate about a fixed base in a relatively simple and inexpensive fashion.

BACKGROUND OF THE INVENTION

A relatively recent advance in the electronic processing of financial transactions has been the utilization of compact credit card readers that incorporate touch screen assemblies or the like for simultaneously reading account information from credit card magnetic strips, and optically verifying the signature of the card holder. Such devices have found wide popularity in a variety of retail settings.

In order to most comfortably accommodate users of such devices, monitor stands have been developed for operably mounting such devices to countertops or the like. As such, certain mounting assemblies incorporate pivoting and rotating mechanisms therein so that the electronic visual display portions of such monitors may be conveniently visible to users of various size.

Mounting assemblies developed to date, however, either incorporate permanently fixed orientations or have relatively expensive mechanisms for providing movable parts to the overall assembly. Moreover, assemblies incorporating movable parts fail to provide adjustment mechanisms so that the user may adjust the degree of resistance to movement of such movable parts that is desired. In addition, current mounting assemblies fail to incorporate locking mechanisms for releasably locking respective movable portions thereof in desired orientations.

Although the above-stated problems occur most frequently in assemblies being utilized in combination with credit card reading systems, a variety of other display stand applications exists wherein the mechanisms of the present invention provide added effectiveness.

It is therefore a principal object of the present invention to provide a monitor mounting apparatus that enables the selective adjustment of resistance to rotational movement between a rotatably secured monitor mounting plate and a fixed base.

It is a further object of the present invention to provide a means for selectively adjusting resistance to rotational movement between respective moving parts in a monitor mounting stand that incorporate a central bore through which electrical wires and the like may be operably threaded.

It is a still further object of the present invention to provide a monitor mounting apparatus that incorporates a monitor mounting plate that is selectively pivoted with respect to a fixed base, and which further includes a locking mechanism for operably and selectively locking the monitor mounting plate in one or more predetermined pivot positions.

SUMMARY OF THE INVENTION

By means of the present invention, a monitor mounting apparatus is provided having a mechanism for selectively adjusting the level of resistance to relative rotational movement between respective components of the apparatus. Specifically, the present invention provides a mechanism for selectively adjusting the frictional resistance to rotational movement of a monitor mounting plate with respect to a fixed base portion of the mounting apparatus. Moreover, the apparatus of the invention provides a locking mechanism for operably locking the pivoting motion of a monitor mounting plate with respect to the base portion at one or more predetermined relative orientations.

In a particular embodiment, the monitor mounting apparatus of the invention includes a base assembly having a first fixed portion defining a first plane and a first axis oriented substantially perpendicular to the first plane, and a second rotatable portion that is rotatably coupled to the first fixed portion about the first axis and in a second plane substantially parallel to the first plane. The base assembly further includes a tensioning mechanism for operably and selectively adjusting frictional resistance to the rotatable coupling between the second rotatable portion and the first fixed portion. The monitor mounting apparatus preferably further includes a monitor mounting plate operably coupled to the second rotatable portion of the base assembly.

The first fixed portion of the base assembly preferably includes a first aperture disposed therein and in axial alignment with the first axis, as well as an annular flange radially arranged about the first axis and extending substantially perpendicularly from an outer periphery of the first aperture. In order for the second rotatable portion to be operably disposed about the annular flange, a second aperture is provided in the second rotatable portion in operable axial alignment with the first axis.

In particular embodiments, the tensioning mechanism operably bears against the second rotatable portion so as to induce frictional resistance to rotational movement between the second rotatable portion and the first fixed portion. To do so, the tensioning mechanism comprises a ring that extends at least partially about the annular flange, with the ring having a radial protrusion that extends radially inwardly from the ring and is operably disposed in an open slot in the annular flange. The open slot in the annular flange is preferably oriented in an angular relationship with the first plane, wherein the angular relationship is between about 2° and about 75°.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
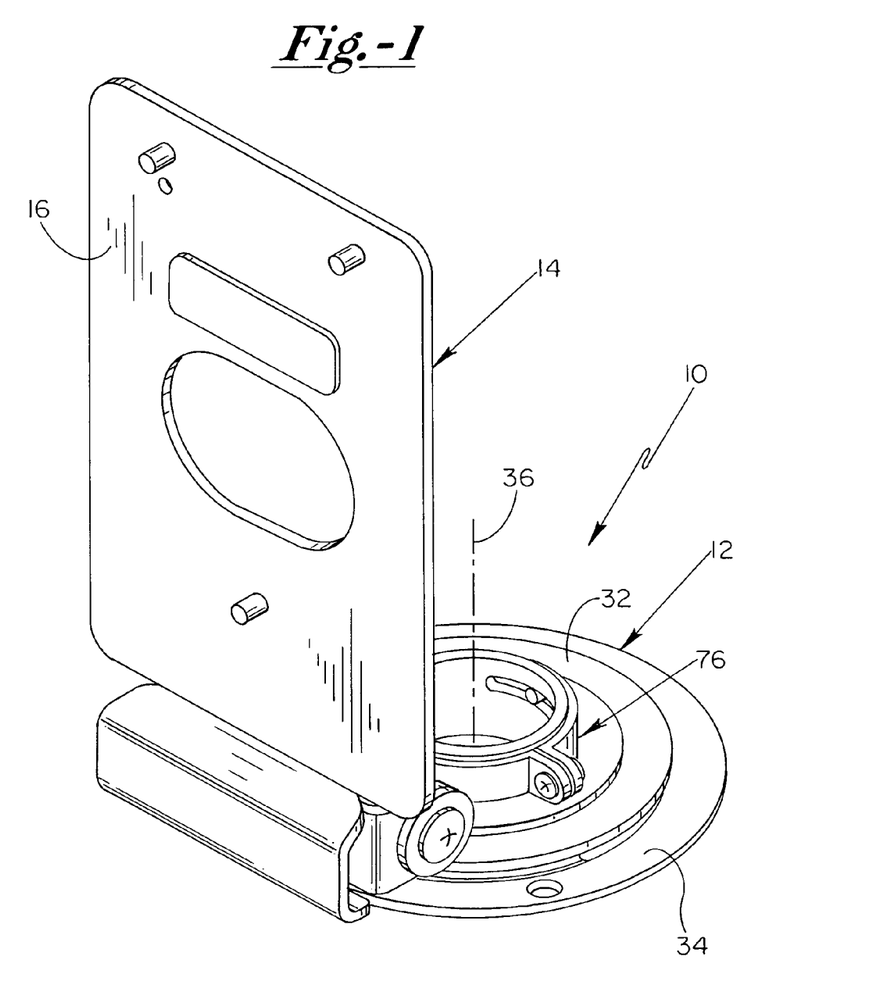
FIG. 1 is a front perspective view of a monitor mounting apparatus of the present invention.
Figure 2:
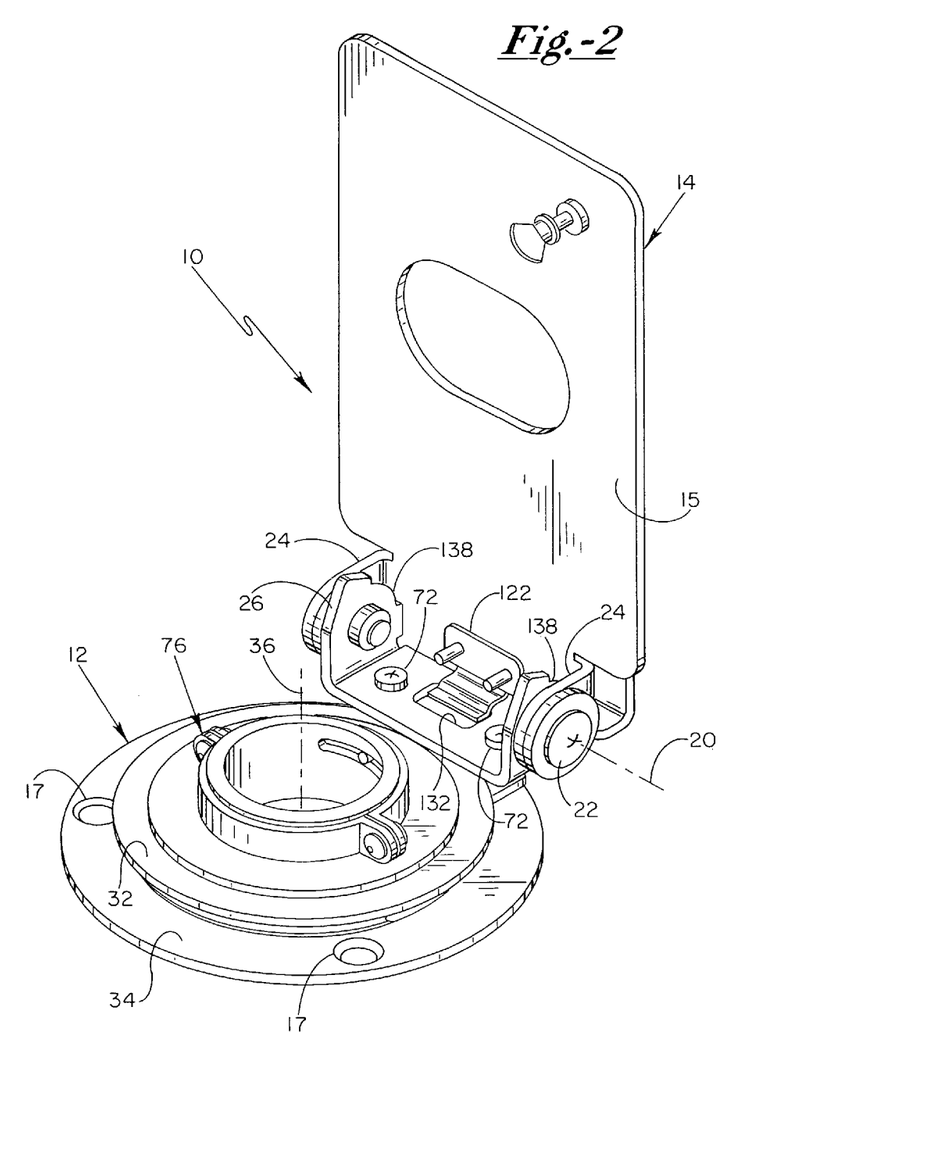
FIG. 2 is a rear perspective view of the monitor mounting apparatus illustrated in FIG. 1.

With reference now to the drawing figures, and first to FIGS. 1 and 2, a monitor mounting apparatus 10 of the present invention is shown, which mounting apparatus 10 preferably includes a base assembly 12 and a monitor mounting plate 14 operably coupled to base assembly 12.

FIG. 1 of the drawings represents a front perspective view of apparatus 10, wherein front surface 16 of mounting plate 14 is preferably operably disposed in facing relationship with a monitor (not shown) that is secured to mounting plate 14. In a particular embodiment, base assembly 12 may be secured to a substantially horizontal surface, such as a countertop, via fasteners extending through apertures 17. Mounting plate 14 preferably pivots independently with respect to base assembly 12 about axis 20, which is defined by one or more bolts 22 extending through respective flanges 24, 26 in mounting plate 14 and connector element 28. Further details regarding the pivoting securement of mounting plate 14 to base assembly 12 via connector element 28 are described in greater detail hereinbelow.

Mounting plate 14 is further preferably rotatably secured to base assembly 12 via rotating ring 32 that is rotatably coupled to base element 34. In such a manner, mounting plate 14 preferably operably rotates about an axis 36 with respect to base element 34.

Figure 3:
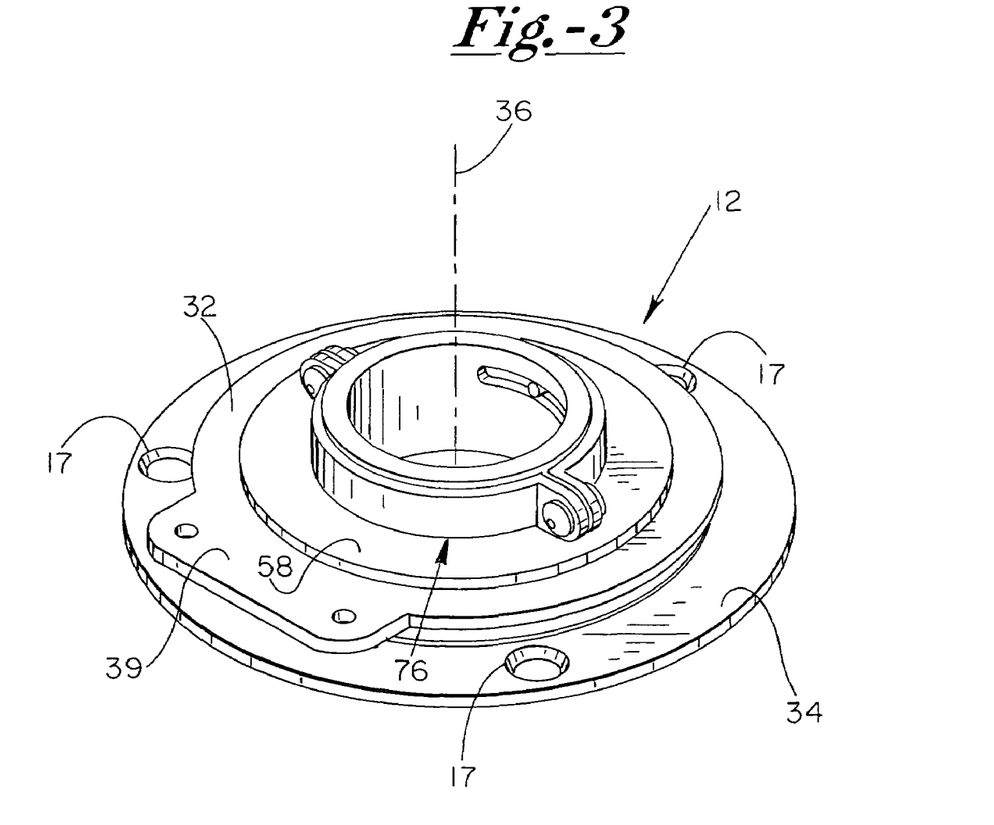
FIG. 3 is an isolation perspective view of a portion of the monitor mounting apparatus illustrated in FIGS. 1 and 2.

An isolation view of base assembly 12 is illustrated in FIG. 3, with rotating ring 32 being shown more clearly as being rotatably mounted with respect to base element 34. With further reference to the exploded view of base assembly 12 in FIG. 4, base element 34 preferably includes apertures 17 for operably receiving fasteners therethrough so as to fixedly secure base element 34 to a support surface such as a countertop or the like. Base element 34 preferably further includes a first aperture 42 disposed therein and in axial alignment with axis 36. In preferred embodiments, first aperture 42 is substantially centrally located in base element 34 and extends therethrough from an upper surface 35 to a lower surface 33 thereof.

Figure 4:
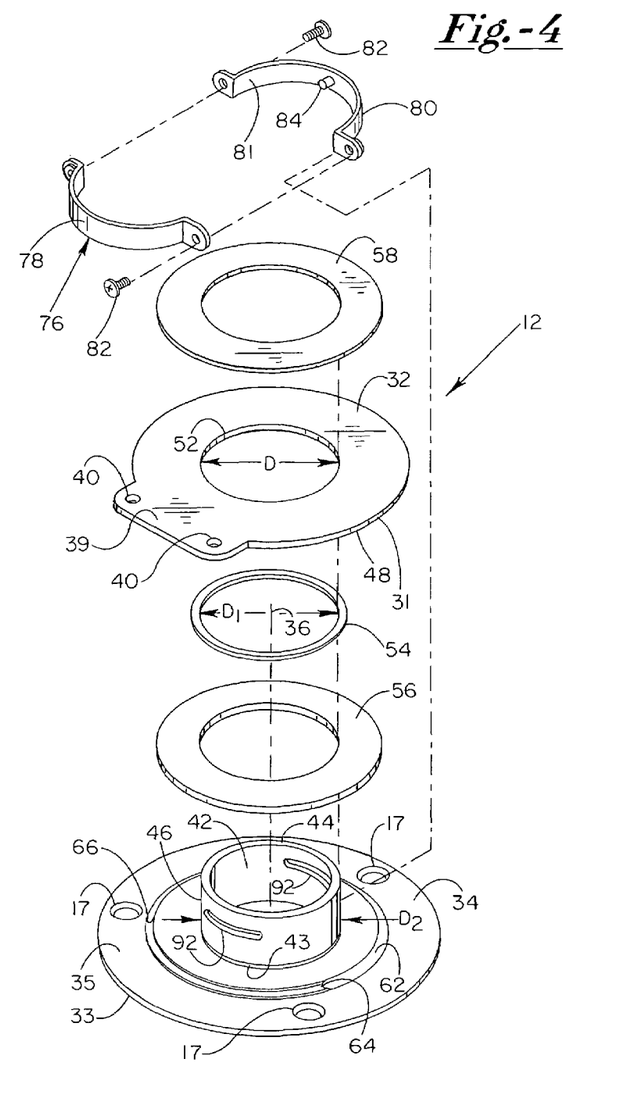
FIG. 4 is an exploded perspective view of the portion of the monitor mounting apparatus illustrated in FIG. 3.
Figure 5:
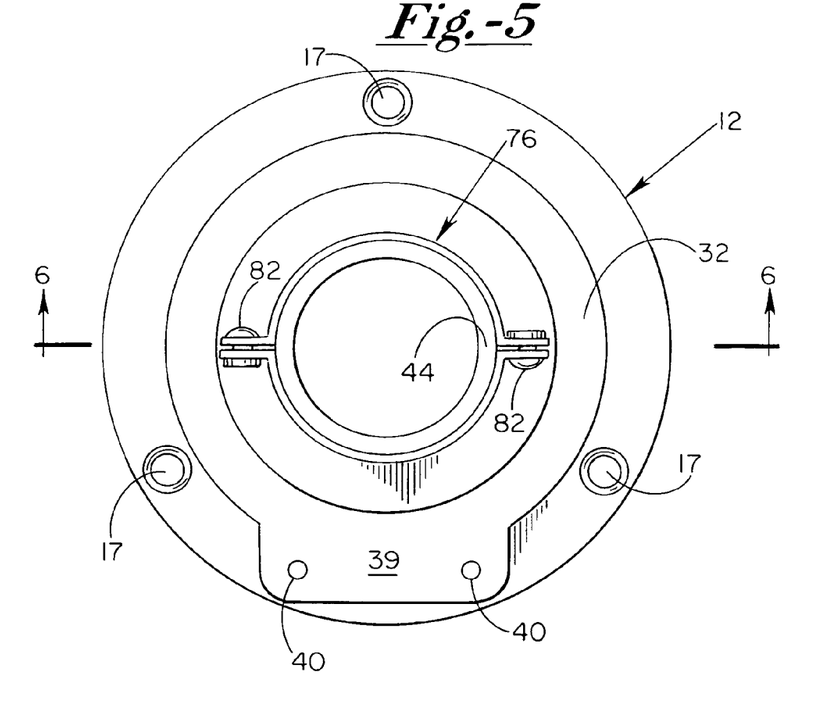
FIG. 5 is a top isometric view of the portion of the monitor mounting apparatus illustrated in FIG. 3.

As best illustrated in FIG. 4, base element 34 further includes an annular flange 44 that is radially arranged about axis 36 and extends substantially perpendicularly from upper surface 35 at outer periphery 43 of first aperture 42. Preferably, annular flange 44 is integrally formed with base element 34 and extends upwardly by a distance of between about 0.25 inches and about 2.5 inches, though other size dimensions for annular flange 44 are contemplated by the present invention.

Rotating ring 32 preferably includes a second aperture 52 disposed therein and configured to be operably disposed and mounted about exterior side wall surface 46 of annular flange 44. In some embodiments of the present invention, a relatively low friction bushing 54 is provided for operable insertion within second aperture 52 in rotating ring 32, and substantially in a plane defined by rotating ring 32. An outer diameter dimension of bushing 54 is preferably substantially equal to, but slightly smaller than, diameter "D" of second aperture 52, so that bushing 54 snuggly and frictionally fits in second aperture 52. Correspondingly, inner diameter dimension $D_1$ of bushing 54 is substantially equal to, but slightly larger than, an outer diameter dimension "$D_2$" of annular flange 44, such that the combination of bushing 54 within second aperture 52 of rotating ring 32 fits snuggly about annular flange 44.

Bushing 54 is preferably fabricated from a relatively low-friction material in order to allow rotating ring 32 to rotate about annular flange 44 with little frictional resistance. A particularly preferred material for bushing 54 is ultra-high molecular weight polyethylene (UHMWPE), though other materials such as Teflon®, and other polymeric materials may be used in place of UHMWPE for bushing 54.

In preferred embodiments of the present invention, both base element 34 and rotating ring 32 are fabricated from relatively strong and durable materials, such as nickel steel, anodized steel, galvanized steel, aluminum, and the like. Since such materials typically have physical surface characteristics that generate frictional resistance to relative movement when two pieces of such material are placed in intimate contact with one another, the base assembly 12 of the present invention preferably utilizes one or more low-friction washers 56, 58. Such relatively low-friction washers 56, 58 are preferably fabricated from material akin to those utilized in the fabrication of bushing 54, such as UHMWPE and the like. First washer 56 is preferably operably disposed immediately adjacent upper surface 35 of base element 34 and between base element 34 and rotating ring 32. In such a manner, respective surfaces of rotating ring 32 and base element 34 do not come into contact with one another, but instead are in intimate contact with respective surfaces of washer 56, thereby substantially reducing the degree of frictional resistance to rotational movement of rotating ring 32 with respect to base element 34.

In some embodiments of the present invention, rotating ring 32 further includes a protrusion 48 extending downwardly from a lower surface 31 of rotating ring 32. Protrusion 48 is preferably located at rotating ring 32 and configured to be operably disposed in annular slot 62 of base element 34. Such a relationship provides a limited degree of rotational movement of rotating ring 32 with respect to base element 34, in that protrusion 48 freely travels only through the length of annular slot 62. In other words, when protrusion 48 comes into contact with first and second ends 64, 66 of annular slot 62 during the operable rotation of rotating ring 32 with respect to base element 34, further rotation in that direction is prohibited. Thus, in the embodiment illustrated in FIG. 4, annular slot 62 allows about 180 degrees of rotation of rotating ring 32 about axis 36 by providing annular slot 62 along only 180 degrees of travel about axis 36.

Rotating ring 32 preferably further includes mounting portion 39 and one or more apertures 40 for receiving fasteners 72 therethrough as illustrated in FIG. 2. As such, connector element 28 preferably secures to mounting portion 39 of rotating ring 32 via fasteners 72 extending through respective apertures 40. In the manner above described, therefore, mounting plate 14 operably mounts to rotating ring 32, thereby providing a rotational characteristic to mounting plate 14 about axis 36 with respect to base element 34.

As further illustrated in FIG. 4, a tensioning ring 76 is provided for operable disposition about annular flange 44 of base element 34. Tensioning ring 76 is preferably axially displaced from rotating ring 32 via second washer 58, such that rotating ring 32 may rotate with respect to tensioning ring 76. In certain embodiments of the invention, tensioning ring 76 is made up of first and second mateable pieces 78, 80 which may be operably connected to one another as illustrated in FIG. 4 via fasteners 82. Preferably, such fasteners 82 removably secure first and second pieces 78, 80 to one another, and offer progressive tightening features such as threads in threaded recesses or the like. When operably coupled to one another, first and second pieces 78, 80 of tensioning ring 76 form an internal diameter that is substantially equal to, but slightly smaller than outer diameter $D_2$ of annular flange 44. As such, tensioning ring 76 may be tightly secured about exterior surface 46 of annular flange 44 via fasteners 82.

As a primary feature of the present invention, tensioning ring 76 includes a radial protrusion 84 that extends radially inwardly from tensioning ring 76. As illustrated in FIG. 4, radial protrusion 84 extends from inner surface 81 of second piece 80. Radial protrusion 84 is preferably configured to operably extend into one or more tensioning slots 92 in annular flange 44 when tensioning ring 76 is operably disposed thereabout. In some embodiments of the invention, both first and second pieces 78, 80 include a radial protrusion 84 inwardly disposed therefrom so as to extend into respective tensioning slots 92 in annular flange 44.

Figure 6:
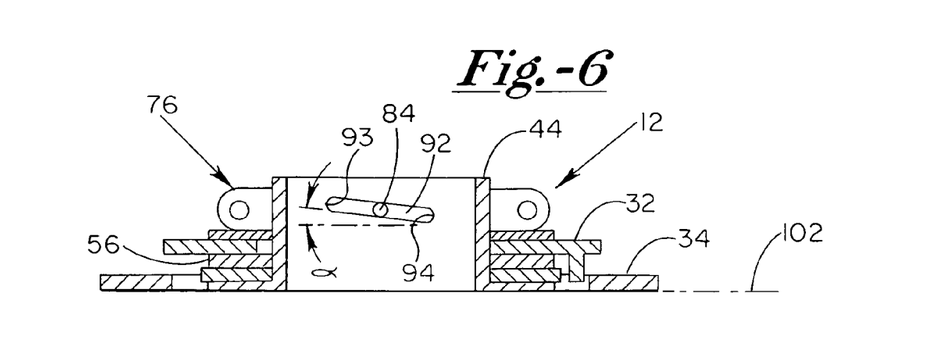
FIG. 6 is a cross-sectional view taken along cut line A-A in FIG. 5.

As best illustrated in the cross-sectional view of FIG. 6, tensioning slot 92 in annular flange 44 is preferably oriented in angular relationship with a first plane 102 defined by base element 34. Radial protrusion 84 is shown being operably disposed in tensioning slot 92. In operation, tensioning ring 76 is mounted about annular flange 44 with radial protrusion 84 extending into tensioning slot 92 such that ring 76 operably axially bears against second washer 58. As a consequence of such pressure placed against second washer 58 by tensioning ring 76, surface pressures are developed between respective surfaces of second washer 58, rotating ring 32, first washer 56, and base element 34. The angular relationship of tensioning slot 92 with respect to first plane 102 enables radial protrusion 84, and consequently tensioning ring 76, to be adjustably axially positioned with respect to base element 34.

As tensioning ring 76 is mounted about annular flange 44 in axial positions closer to base element 34, respective surface pressures between the components of base assembly 12 are correspondingly increased. Since frictional resistance to movement is proportional to the surface pressure between adjacent objects, the selective increase of such surface pressures by the adjustable axial displacement of tensioning ring 76 correspondingly adjusts the amount of frictional resistance to the rotational movement of rotating ring 32 with respect to base element 34. As such, the adjustable axial displacement of tensioning ring 76 enables a user to selectively adjust the level of resistance desired in rotating rotatable ring 32 and correspondingly mounting plate 14 about annular flange 44 of base element 34.

By way of example, tensioning ring 76 may be operably mounted about annular flange 44 via fasteners 82 at a distally disposed axial position with respect to base element 34. As such distal axial position, radial protrusion 84 is operably disposed at an upper end 93 of tensioning slot 92. In this position, the least amount of frictional resistance to rotational movement of rotating ring 32 that is available in the assembly is being utilized. In order to increase the level of frictional resistance to rotational movement of rotating ring 32 about annular flange 44, fasteners 82 are loosened such that tensioning ring 76 may be rotated about annular flange 44 and axis 36. Such rotation causes radial protrusion 84 to move from first end 93 toward second end 94 of tensioning slot 92. In doing so, radial protrusion 84 within tensioning slot 92 causes tensioning ring 76 to axially displace toward base element 34, thereby increasing frictional resistance in the system. When a desired degree of frictional resistance is obtained, fasteners 82 are re-tightened to tightly secure tensioning ring 76 about annular flange 44, thereby removably affixing a relative axial position of tensioning ring 76 with respect to base element 34.

Although tensioning ring 76 is illustrated in FIG. 4 as comprising two distinct pieces 78, 80, it is contemplated by the present invention that tensioning ring 76 may be fabricated from a single piece that includes a single location for operably clamping together a single open end thereof.

Preferably, the angular relationship between tensioning slot 92 and first plane 102, as defined by "$\alpha$" is between about 2° and about 75°. The amount of axial displacement between first end 93 and second end 94 of tensioning slot 92 is preferably between about 0.010 and about 0.250 inches. More preferably, the axial displacement between first and second ends 93, 94 of tensioning slot 92 is between about 0.030 and about 0.090 inches.

In a further aspect of the present invention, mounting plate 14 is preferably pivotally coupled to base assembly 12 via connector element 28 that is operably secured to rotating ring 32 by fasteners 72 extending through respective apertures and connector element 28 and apertures 40 in rotating ring 32. Through such an engagement, connector element 28 may be fixedly and/or removably secured to rotating ring 32 of base assembly 12.

Figure 7:
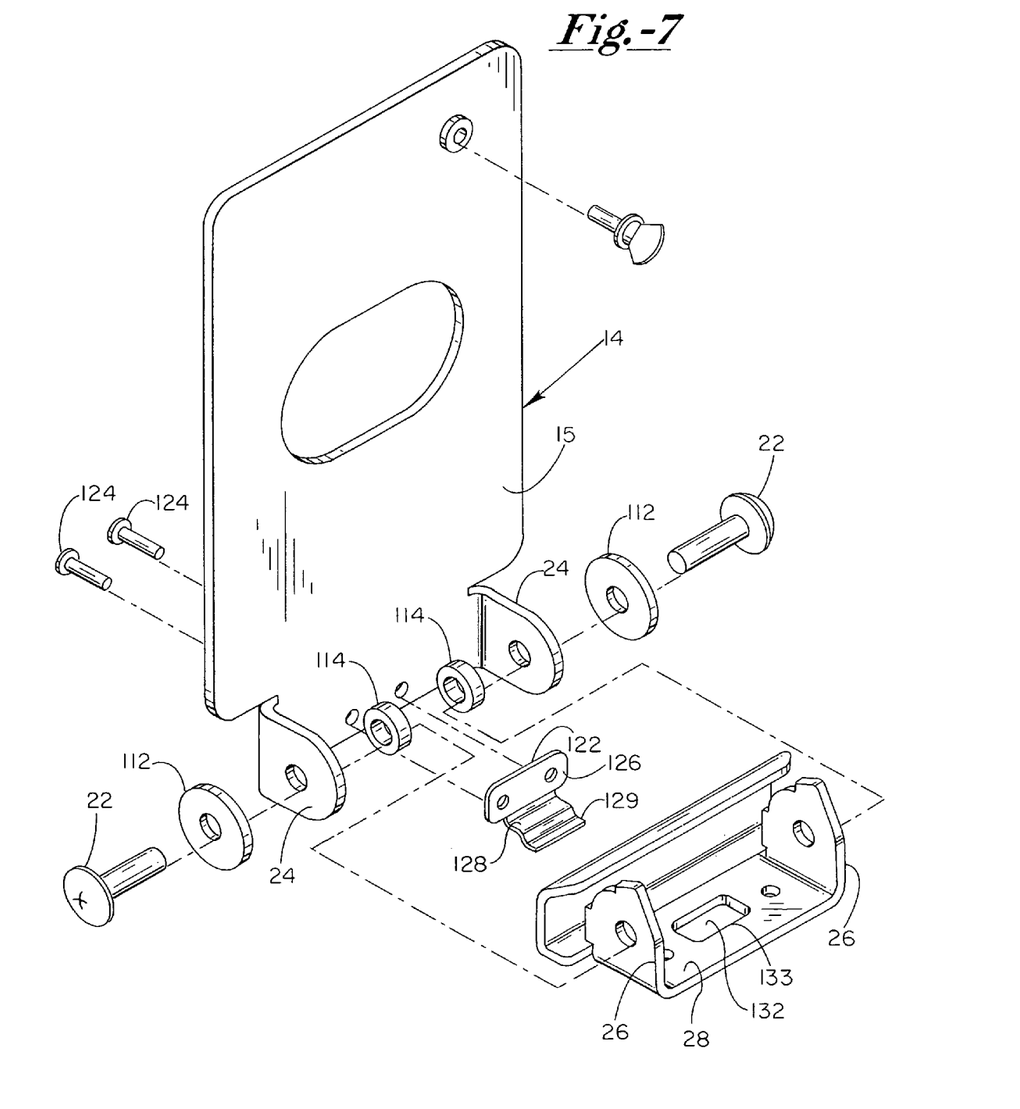
FIG. 7 is an exploded perspective view of a portion of the monitor mounting apparatus illustrated in FIGS. 1 and 2.

As further illustrated in the exploded view of FIG. 7, mounting plate 14 is preferably pivotally secured to connector element 28 via fasteners 22 extending through respective flanges 24, 26 of mounting plate 14 and connector element 28, respectively. In order to facilitate relative pivoting motion between mounting plate 14 and connector element 28, relatively low-friction washers 112, 114 are disposed between respective facing surfaces of flanges 24, 26, and between flanges 24 and fasteners 22. Such washers are preferably fabricated from a material such as UHMWPE, or the like. Through such an operable engagement, monitor mounting plate 14 preferably operably pivots about axis 20 that is defined by fasteners 22 extending through respective apertures in mounting portions 24, 26.

A further aspect of the present invention is illustrated in FIGS. 2 and 7 wherein a locking clip 122 is shown as being operably coupled to mounting plate 14 via fasteners 124 extending through respective apertures in mounting plate 14 and locking clip 122. Locking clip 122 preferably includes a brace portion 126 and a spring portion 128, with the brace portion 126 being operably secured in abutting relationship to mounting plate 14. Spring portion 128 is preferably fabricated from a material having a gauge thickness that is sufficiently thin so as to provide a resilient characteristic thereto. In this manner, spring portion 128 may be operably deflected from a pre-defined orientation.

In operation, mounting plate 14 operably pivots with locking clip 122 being secured thereto. As mounting plate 14 is pivoted into a substantially vertical orientation, such as that illustrated in FIGS. 1 and 2, spring portion 128 is operably brought into communication with locking aperture 132 of connector element 28. The latent restorative force of spring portion 128 causes at least a portion thereof to extend into locking aperture 132, thereby arresting further pivoting motion of connector element 14 with respect to base assembly 12. In this manner, a "locking" characteristic is provided to mounting plate 14 at a predetermined relative pivoting orientation with respect to base assembly 12. Such a predetermined locked orientation is defined by the location of locking aperture 132 in connector element 28.

Spring portion 128 preferably includes a curved distal end 129 that provides a leveraging force against spring portion 128 when mounting plate 14 is pivoted rearwardly so as to operably engage distal end 129 with rear side 133 of locking aperture 132. This leveraging mechanism enables a user to operably deflect spring portion 128 of locking clip 122 out from locking aperture 132 with a reasonable amount of force applied to mounting plate 14. The disengagement of spring portion 128 from locking aperture 132 enables the user to freely pivot mounting plate 14 rearwardly about axis 20. Locking clip 122, therefore, enables a user to freely pivot mounting plate 14 between a first portion wherein rear surface 15 of mounting plate 14 engages with stop surfaces 138 of connector element 28, and a substantially vertical position wherein spring portion 128 of locking clip 122 engages with locking aperture 132. At both extreme positions of the pivoting motion of mounting plate 14, a positive stop is provided to further pivoting motion so as to create a relatively solid surface against which a display monitor or the like may be mounted.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

The invention claimed is:

1. A monitor mounting apparatus, comprising:
   (a) a base assembly having:
      (i) a first fixed portion defining a first plane and a first axis oriented substantially perpendicular to said first plane, and including a first aperture disposed therein and in axial alignment with said first axis, and an annular flange radially arranged about said first axis and extending substantially perpendicularly from an outer periphery of said first aperture;
      (ii) a second rotatable portion that is rotatably coupled to said first fixed portion about said first axis and in a second plane substantially parallel to said first plane, and including a second aperture that is in operable axial alignment with said first axis, such that said second rotatable portion is operably disposed about said annular flange; and
      (iii) a tensioning means for operably and selectively adjusting frictional resistance to the rotatable coupling between said second rotatable portion and said first fixed portion, and including a ring that extends at least partially about said annular flange, said ring having a radial protrusion that extends radially inwardly from said ring and is operably disposed in an open slot in said annular flange, with said open slot being oriented in angular relationship with said first plane, wherein the angular relationship is between about two degrees and about 75 degrees; and
   (b) a monitor mounting plate operably coupled to said second rotatable portion of said base assembly.

2. A monitor mounting apparatus as in claim 1 wherein said monitor mounting plate is pivotally coupled to said second rotatable portion of said base assembly about a second axis oriented substantially perpendicular to said first axis.

* * * * *

UNITED STATES PATENT AND TRADEMARK OFFICE
CERTIFICATE OF CORRECTION

| | | |
|---|---|---|
| PATENT NO. | : 7,434,774 B1 | Page 1 of 1 |
| APPLICATION NO. | : 10/977980 | |
| DATED | : October 14, 2008 | |
| INVENTOR(S) | : Peter J. Floersch, Mark W. Wacker and Greg J. Miller | |

It is certified that error appears in the above-identified patent and that said Letters Patent is hereby corrected as shown below:

Title page, Item (73) Assignee, replace "Burnsville, MA" with --Burnsville, MN--

Signed and Sealed this

Thirtieth Day of December, 2008

JON W. DUDAS
*Director of the United States Patent and Trademark Office*